United States Patent
Li et al.

(10) Patent No.: US 10,523,148 B2
(45) Date of Patent: Dec. 31, 2019

(54) RECONFIGURABLE WINDING CONNECTION FOR FIVE-PHASE PERMANENT MAGNET ELECTRIC MACHINE

(71) Applicant: FORD GLOBAL TECHNOLOGIES, LLC, Dearborn, MI (US)

(72) Inventors: Silong Li, Canton, MI (US); Wei Xu, Canton, MI (US); Jiyao Wang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/974,166

(22) Filed: May 8, 2018

(65) Prior Publication Data
US 2019/0348940 A1   Nov. 14, 2019

(51) Int. Cl.
| | |
|---|---|
| *H02P 27/06* | (2006.01) |
| *H02P 25/18* | (2006.01) |
| *H02P 25/022* | (2016.01) |
| *H02P 25/22* | (2006.01) |
| *B60L 50/51* | (2019.01) |

(52) U.S. Cl.
CPC .............. *H02P 25/18* (2013.01); *B60L 50/51* (2019.02); *H02P 25/022* (2013.01); *H02P 25/22* (2013.01); *H02P 27/06* (2013.01); *B60L 2210/46* (2013.01)

(58) Field of Classification Search
CPC .. H02P 25/22; H02P 21/06; H02P 8/14; H02P 6/10; H02P 4/00
See application file for complete search history.

(56) References Cited

U.S. PATENT DOCUMENTS

| | | | | |
|---|---|---|---|---|
| 3,720,865 | A * | 3/1973 | Bregeault | H02K 29/08 318/400.35 |
| 4,739,239 | A * | 4/1988 | Krause | G11B 5/553 318/567 |
| 4,912,379 | A * | 3/1990 | Matsuda | H02P 6/10 318/400.11 |
| 6,426,605 | B1 * | 7/2002 | Toliyat | H02P 27/06 318/448 |
| 6,664,754 | B2 * | 12/2003 | Misumi | H02P 8/14 318/599 |
| 6,853,107 | B2 | 2/2005 | Pyntikov et al. | |
| 7,847,437 | B2 * | 12/2010 | Chakrabarti | H02P 4/00 307/82 |
| 9,800,193 | B2 | 10/2017 | Mao et al. | |
| 9,882,521 | B2 | 1/2018 | Namuduri et al. | |
| 2011/0221366 | A1 * | 9/2011 | Gallegos-Lopez | H02P 21/06 318/400.02 |
| 2014/0103850 | A1 * | 4/2014 | Frank | H02P 25/22 318/496 |
| 2015/0069949 | A1 * | 3/2015 | Mohammadpour | H02P 25/22 318/724 |
| 2015/0270747 | A1 * | 9/2015 | Toliyat | H02K 5/132 310/68 R |

* cited by examiner

*Primary Examiner* — Rina I Duda
(74) *Attorney, Agent, or Firm* — David Kelley; Brooks Kushman P.C.

(57) ABSTRACT

A vehicle includes a five-phase electric machine with open windings driven at each side by phase legs of an inverter. A controller monitors for open-circuit windings. In response to detecting an open-circuit winding above a predetermined speed threshold, the controller operates the inverter to drive the windings that are not open-circuited in a square configuration.

20 Claims, 3 Drawing Sheets

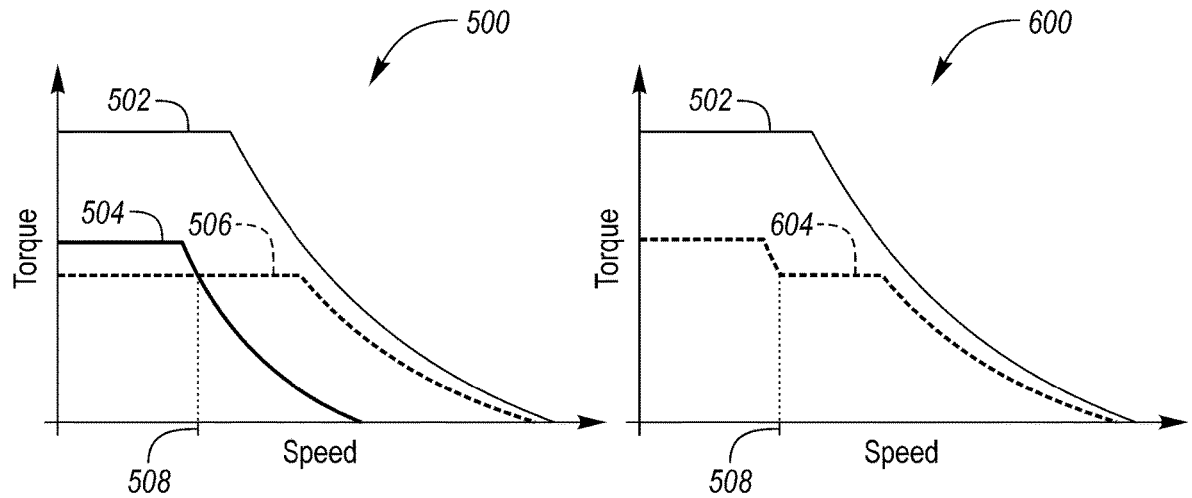
FIG. 5  FIG. 6
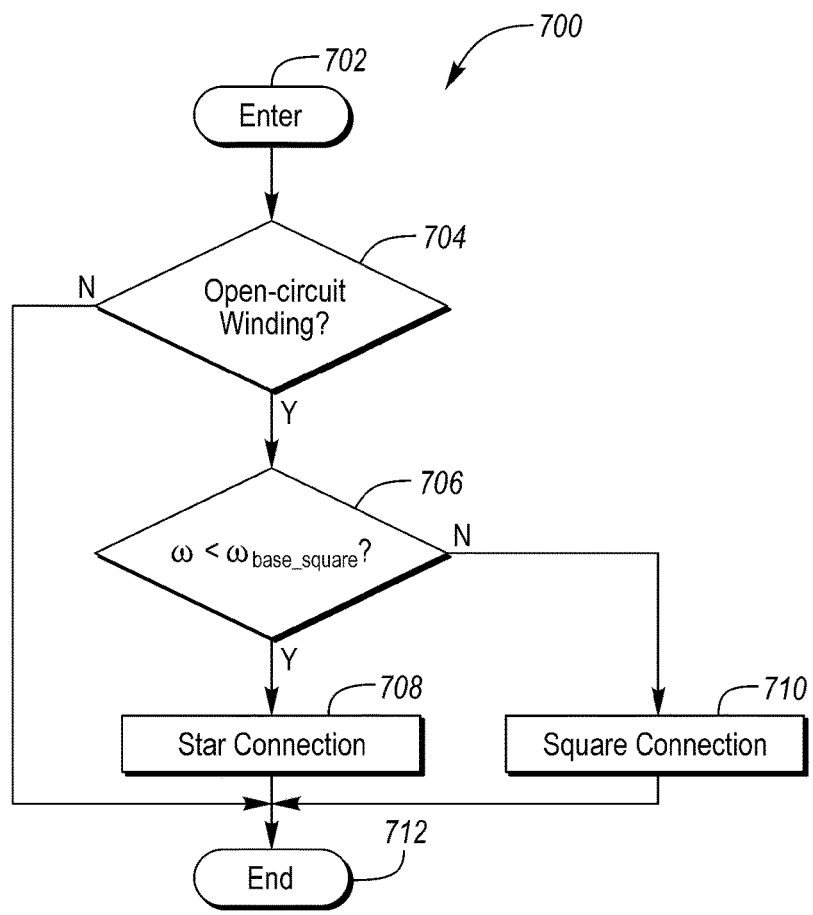
FIG. 7

RECONFIGURABLE WINDING CONNECTION FOR FIVE-PHASE PERMANENT MAGNET ELECTRIC MACHINE

TECHNICAL FIELD

This application generally relates to a system for operating a five-phase permanent magnet machine when one of the windings is open-circuited.

BACKGROUND

Hybrid-electric and electric vehicles use electrical energy for propulsion. Typical hybrid and electric powertrains utilize three-phase motors and inverters to provide propulsion. Such systems are well understood and components are readily available. Under abnormal operating conditions, such as an open-circuit winding, such systems may be shut down to prevent degraded operation. For example, when one of the windings or connections is open-circuited, current cannot flow to that winding and the torque characteristics of the motor may change. A typical response is to stop operating the three-phase motor which can prevent the vehicle from finishing a drive cycle.

SUMMARY

A vehicle includes a pair of inverters, each having five phase legs electrically coupled at opposite ends of windings of a five-phase electric machine. The vehicle further includes a controller programmed to operate the inverters to drive the windings in a star configuration, and, responsive to detecting an open circuit in one of the windings and a speed of the electric machine exceeding a threshold, operate the inverters to drive the remaining windings in a square configuration.

The controller may be further programmed to operate the inverters to drive the windings in the star configuration by causing switching devices in one of the inverters to connect associated ends of each of the windings to a common conductor. The controller may be further programmed to control a torque output of the electric machine by causing a voltage output for each phase leg of the one of the inverters associated with an end of the windings opposite to that coupled to the common conductor. An amplitude of the voltage output may be greater than a voltage amplitude applied in an absence of detecting the open circuit of the one of the windings. The controller may be further programmed to operate the inverters to drive the remaining windings in the square configuration by controlling a voltage output of each phase leg of the inverters such that voltages applied to the windings are the same as if the windings are physically connected in a loop in which each of the windings is electrically coupled to two other windings. An amplitude of the voltage output of each phase leg may be less than a voltage amplitude applied in an absence of detecting the open circuit of the one of the windings. The controller may be further programmed to operate the inverters to provide zero voltage to the one of the windings. The threshold may be a speed at which a maximum torque of the electric machine driven in the star configuration is equal to a maximum torque of the electric machine driven in the square configuration. The controller may be further programmed to, responsive to the speed of the electric machine falling below the threshold while detecting the open circuit of the one of the windings, operate the inverters to drive the remaining windings in the star configuration.

A method includes operating one or more inverters to drive windings of a five-phase electric machine in a star configuration. The method further includes, responsive to detecting an open circuit in one of the windings and a speed of the electric machine exceeding a threshold, changing from operating the inverters to drive the windings in the star configuration to operating the inverters to drive the windings that are not open-circuited in a square configuration.

The method may further include, responsive to the speed falling below the threshold while the one of the windings is open circuited, changing from operating the inverters to drive the windings that are not open-circuited in the square configuration to operating the inverters to drive the windings that are not open-circuited in the star configuration. The threshold may be a speed at which a maximum torque of the electric machine operated in the star configuration is equal to a maximum torque of the electric machine operated in the square configuration. Operating the electric machine in the star configuration may include operating one of the inverters to selectively couple each of the windings to a common neutral point. Operating the inverters to drive the windings in the square configuration may include operating the one or more inverters so that voltages applied to the windings are the same as if the windings are physically connected in a loop in which each of the windings is electrically coupled to two other windings.

An electrified powertrain includes an electric machine having five phase windings and one or more inverters having phase legs electrically coupled to each end of the windings. The electrified powertrain further includes a controller programmed to, responsive to one of the windings being open circuited, change from operating the inverters to drive the windings in a star configuration to operating the inverters to drive the windings in a square configuration.

The controller may be further programmed to operate the inverters to drive the windings in the star configuration by causing switching devices in one of the inverters to connect an associated end of each of the windings to a common point. The controller may be further programmed to control a torque output of the electric machine by causing a voltage output for each of the phase legs of the one of the inverters associated with an end of the windings that is not coupled to the common point. The controller may be further programmed to operate the inverters in the square configuration by operating the one or more inverters such that voltages applied to the windings are the same as if the windings are physically connected in a loop in which each of the windings is electrically coupled to two other windings. An amplitude of a voltage output of each phase leg may be less than a voltage amplitude when the one of the windings is not open circuited. The controller may be further programmed to change from operating the inverters to drive the windings in the star configuration to operating the inverters to drive the windings in the square configuration responsive to a speed of the electric machine exceeding a threshold that is a predetermined speed at which a maximum torque of the electric machine driven in the star configuration is equal to a maximum torque of the electric machine driven in the square configuration.

BRIEF DESCRIPTION OF THE DRAWINGS

FIG. 5 depicts torque speed curves for an electric machine operating normally, and with an open-circuit winding configured in a star configuration and a square configuration.

FIG. 6 depicts torque-speed curves for an electric machine operating normally and with an open-circuit winding operating with the control strategy disclosed herein.

FIG. 7 is a flowchart for a possible sequence of instructions for operating the electric machine and inverter in a presence of an open-circuit winding.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
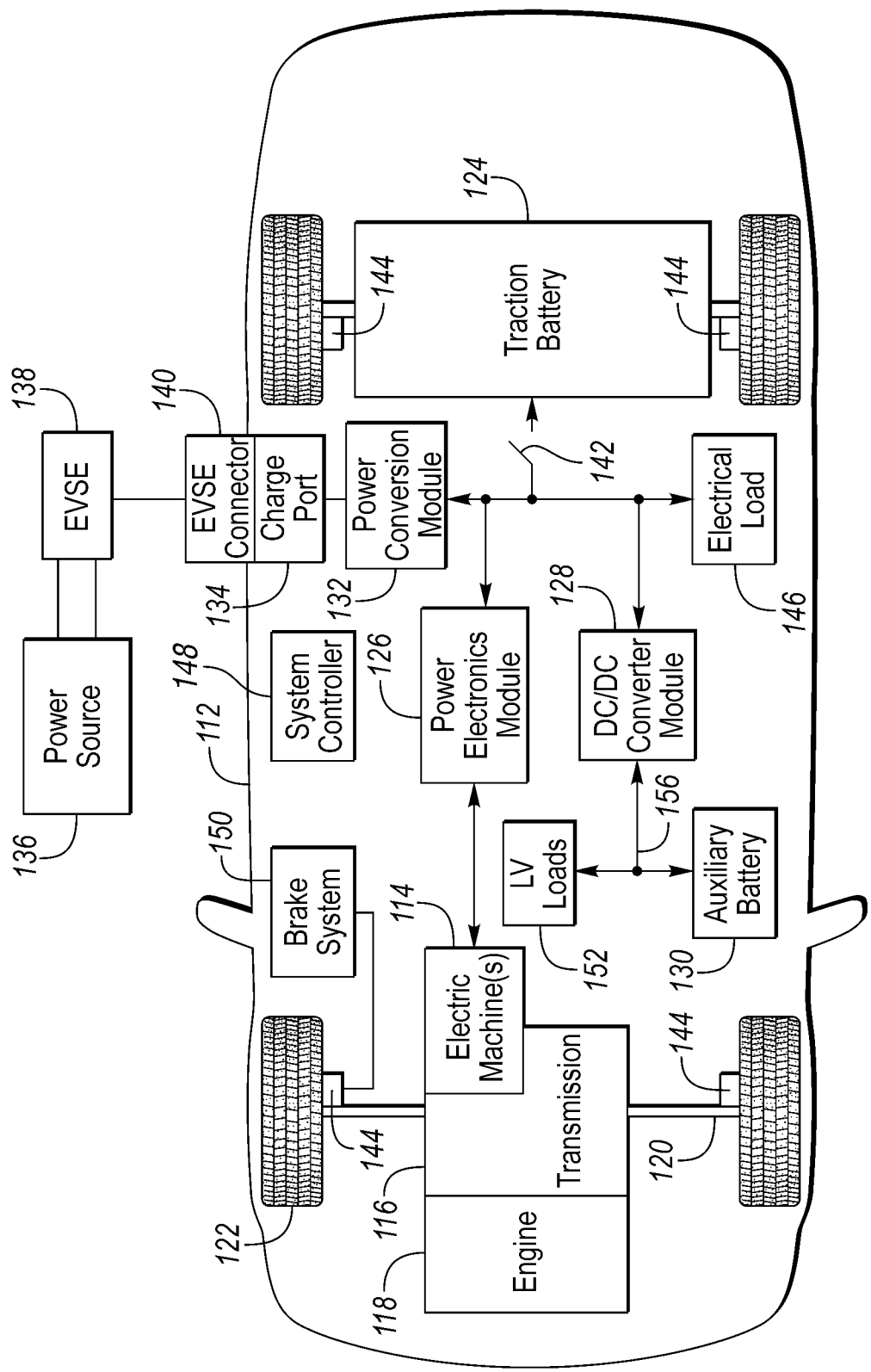
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present.

A traction battery or battery pack 124 stores energy that can be used by the electric machines 114. The vehicle battery pack 124 may provide a high voltage direct current (DC) output. The traction battery 124 may be electrically coupled to one or more power electronics modules 126 (may also be referred to as a traction inverter). One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads 152. An output of the DC/DC converter module 128 may be electrically coupled a low-voltage bus 156 and to an auxiliary battery 130 (e.g., 12V battery) for charging the auxiliary battery 130. The low-voltage systems 152 may be electrically coupled to the low-voltage bus 156. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

In some configurations, the electrified vehicle 112 may be configured to provide power to an external load. For example, the electrified vehicle may be configured to operate as a back-up generator or power outlet. In such applications, a load may be connected to the EVSE connector 140 or other outlet. The electrified vehicle 112 may be configured to return power to the power source 136. For example, the electrified vehicle 112 may be configured to provide alternating current (AC) power to the electrical grid. The voltage supplied by the electrified vehicle may be synchronized to the power line.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

The electric machine 114 may be a five-phase permanent magnet (PM) machine. The electric machine 114 may have five phase windings. The electric machine 114 may be configured such that the phase windings are not internally connected to a common point within the electric machine. The electric machine 114 may be an open-winding configuration that permits reconfiguration of the electric machine connections. The power electronics module 126 may be configured to provide the five-phase voltages/currents to the electric machine.

Figure 2:
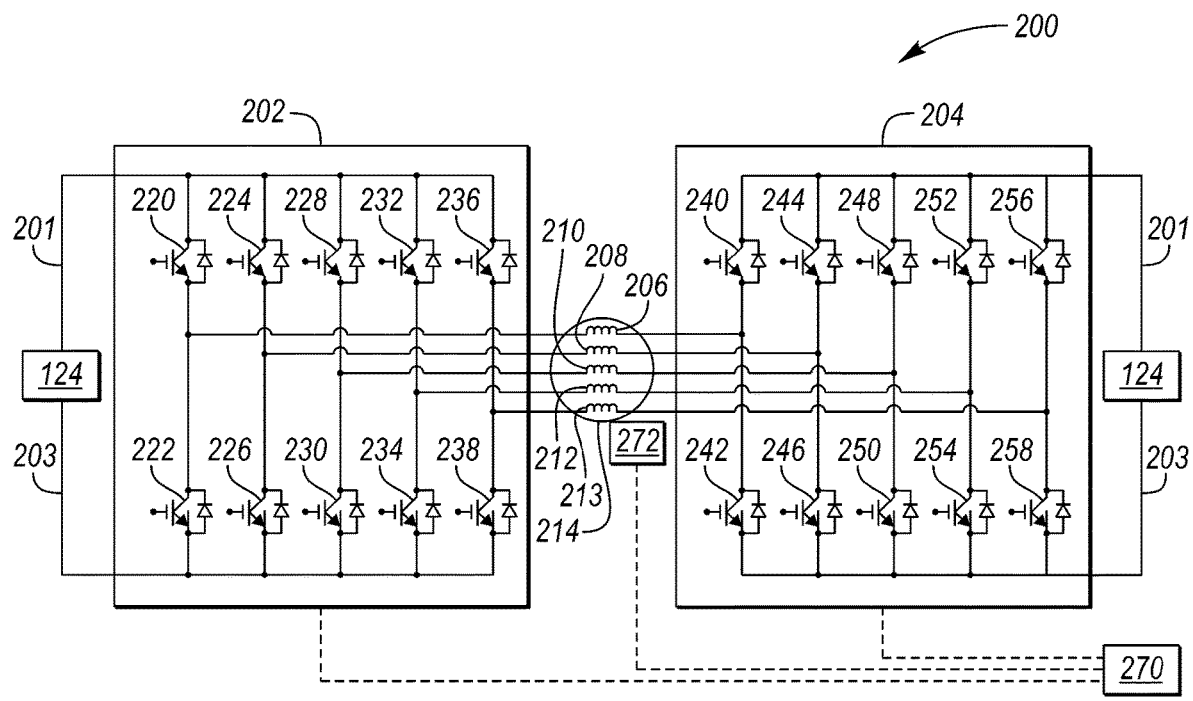
FIG. 2 is a diagram of a five-phase electric machine with open windings controlled by inverters coupled at opposite ends of the windings.

FIG. 2 depicts a possible power electronics configuration for operating a five-phase electric machine 214. The electric machine 214 may be represented by a first phase winding 206, a second phase winding 208, a third phase winding 210, a fourth phase winding 212, and a fifth phase winding 213. Each of the phase windings may have two terminals that are accessible for connecting to the power electronics. The electric machine 214 may be operated by controlling a current through and/or voltage across each of the phase windings. An electrified powertrain 200 may include the electric machine 214 and the power electronics module. The electrified powertrain 200 may be configured to convert electrical energy into mechanical power to provide propulsion for the vehicle. The electrified powertrain may further include any associated controllers configured to operate the electrified powertrain components.

The power electronics may include a pair of inverters configured with five phase legs. The power electronics may include a first inverter module 202 that is configured to selectively couple conductors of a high-voltage power bus to one side of each of the phase windings of the electric machine 214. The power electronics may include a second inverter module 204 that is configured to selectively couple conductors of the high-voltage power bus to the other side of each of the phase windings of the electric machine 214. The high-voltage power bus may include a conductor that is electrically couplable to a positive terminal of the traction battery 124 and referred to as a DC bus power conductor 201. The high-voltage power bus may include a conductor that is coupled to a negative terminal of the traction battery 124 and referred to as a DC bus return conductor 203.

The first inverter module 202 may include a pair of power switching devices for each phase winding of the electric machine 214. Each pair of switching devices may be referred to as a phase leg of the inverter. Each phase leg may include an upper power switching device coupled between the DC bus power conductor 201 and a phase winding. Each phase leg may include a lower power switching device coupled between the DC bus return conductor 203 and the phase winding. Each phase leg may selectively couple the phase winding to the DC bus conductors to control the magnitude and direction of current flow through the phase winding. For the five-phase electric machine 214, each of the inverters may be comprised of five phase legs. In other configurations, a single inverter may be comprised of ten phase legs.

The first inverter module 202 may include five phase legs coupled to an end of the phase windings of the electric machine 214. A first power switching device 220 may be configured to selectively couple the DC bus power conductor 201 to the first phase winding 206. A second power switching device 222 may be configured to selectively couple the DC bus return conductor 203 to the first phase winding 206. A third power switching device 224 may be configured to selectively couple the DC bus power conductor 201 to the second phase winding 208. A fourth power switching device 226 may be configured to selectively couple the DC bus return conductor 203 to the second phase winding 208. A fifth power switching device 228 may be configured to selectively couple the DC bus power conductor 201 to the third phase winding 210. A sixth power switching device 230 may be configured to selectively couple the DC bus return conductor 203 to the third phase winding 210. A seventh power switching device 232 may be configured to selectively couple the DC bus power conductor 201 to the fourth phase winding 212. An eighth power switching device 234 may be configured to selectively couple the DC bus return conductor 203 to the fourth phase winding 212. A ninth power switching device 236 may be configured to selectively couple the DC bus power conductor 201 to the fifth phase winding 213. A tenth power switching device 238 may be configured to selectively couple the DC bus return conductor 203 to the fifth phase winding 213.

The second inverter module 204 may include five phase legs coupled to an opposite end of the phase windings of the electric machine 214. An eleventh power switching device 240 may be configured to selectively couple the DC bus power conductor 201 to the first phase winding 206. A twelfth power switching device 242 may be configured to selectively couple the DC bus return conductor 203 to the first phase winding 206. A thirteenth power switching device 244 may be configured to selectively couple the DC bus power conductor 201 to the second phase winding 208. A fourteenth power switching device 246 may be configured to selectively couple the DC bus return conductor 203 to the second phase winding 208. A fifteenth power switching device 248 may be configured to selectively couple the DC bus power conductor 201 to the third phase winding 210. A sixteenth power switching device 250 may be configured to selectively couple the DC bus return conductor 203 to the third phase winding 210. A seventeenth power switching device 252 may be configured to selectively couple the DC bus power conductor 201 to the fourth phase winding 212. An eighteenth power switching device 254 may be configured to selectively couple the DC bus return conductor 203 to the fourth phase winding 212. A nineteenth power switching device 256 may be configured to selectively couple the DC bus power conductor 201 to the fifth phase winding 213. A twentieth power switching device 258 may be configured to selectively couple the DC bus return conductor 203 to the fifth phase winding 213. In the configuration depicted, the first inverter module 202 and the second inverter module 204 are configured to connect to opposite ends or terminals of the phase windings.

The system may include a rotor position measurement device 272 that is configured to provide an angular position of the rotor of the electric machine 214. For example, the rotor position measurement device 272 may be a resolver or similar device. The system may include a controller 270 that is configured to control and operate the inverter modules. The controller 270 may interface with the rotor position measurement device 272 and receive signals indicative of the rotor position. An angular speed of the rotor may be derived from a derivative of the angular position value with respect to time. The controller 270 may include circuitry and control logic for scaling of the signals to account for the number of electric machine poles and the number of resolver poles. The resolver may include two sets of windings. A first set of windings may return a signal that is the sine of the rotational angle and a second set of windings may return a signal that is the cosine of the rotation angle of the resolver shaft. The resolver angle may be computed as the arc-tangent of the sine of the angle divided by the cosine of the angle.

The power switching devices may be Insulated Gate Bipolar Transistors (IGBT), Metal Oxide Semiconductor Field Effect Transistors (MOSFET), or other solid-state switching devices. Each of the inverters may have associated control inputs (e.g., gate inputs) for controlling operation of the power switching devices. The control inputs may be electrically coupled to the controller 270 that is configured to operate the inverters. The inverters may be operated such that only one of the pair of power switching devices in a phase leg is switched on at a given time to prevent shorting the DC bus power conductor 201 and the DC bus return conductor 203. In some configurations, an anti-parallel diode may be coupled across the power switching devices. In some configurations, a body diode may be present in the power switching devices. The diodes depicted in FIG. 2 may represent the body diode or a separate anti-parallel diode.

The controller 270 may be further configured to drive the power switching devices of the first inverter module 202 and the second inverter module 204. In some configurations, multiple controllers may be present to distribute the processing and input/output functions. For example, each of the first inverter module 202 and the second inverter module 204 may include dedicated controllers that are in communication with a master controller that coordinates the operation of the modules. Operating the inverter modules includes providing control signals for each of the power switching devices. The controller 270 may provide gate drive signals for enabling and disabling current flow through the power switching devices. Further, the controller 270 may be programmed to sequence the gate drive signals to achieve a desired AC voltage across the phase windings.

The controller 270 may implement various algorithms for controlling the inverter modules. The gate terminals of the power switching devices may be driven with Pulse Width Modulated (PWM) signals to control the torque and speed of the electric machine 214. The controller 270 may implement various well-known control strategies to control the electric machine 214 using the power switching devices such as field-oriented control and/or multi-step control. During normal operating conditions, the power switching devices are actively controlled to achieve a desired current through each phase winding and/or voltage across each phase winding of the electric machine 214. The controller 270 may be configured to receive and/or determine a desired torque to be provided by the electric machine 214. The controller 270 may determine the amplitude and frequency of the voltage provided to the phase windings of the electric machined 214 to achieve the desired torque.

In some configurations, the first inverter module 202 and the second inverter module 204 may be integrated into a single power electronics module. The first inverter module 202 and the second inverter module 204 may include one or more current sensors configured to provide a signal indicative of the current flowing through one or more of the phase windings. The first inverter module 202 and the second inverter module 204 may include one or more voltage sensors configured to provide a signal indicative of a voltage in the circuit. For example, a voltage sensor may measure the voltage between the DC bus power conductor 201 and the DC bus return conductor 203. Other voltage sensors may be configured to measure a phase winding voltage (e.g., voltage across a phase winding of the electric machine 214).

In a conventional configuration, the phase windings of the electric machine may be connected in a star configuration. That is, one end of each of the phase windings would be electrically connected to a common neutral point. This connection may be internal to the electric machine and a neutral line or terminal may be provided for external connection. As a result, a conventional configuration only uses one inverter module (e.g., having five phase legs) to control the resulting configuration. In the conventional configuration, performance issues may arise if one of the phase windings becomes open-circuited. With a single inverter, current must flow through two of the windings and associated switching devices. If one of the windings is open-circuited, that current cannot flow and the electric machine may not be properly controlled. The dual-inverter system described can improve the system performance in the presence of an open-circuit condition in one of the phase windings.

The dual-inverter system permits the winding configuration of the electric machine 214 to be reconfigured. The open-circuited winding may be isolated from the other windings and the electric machine 214 may be controlled by managing current through the remaining windings. The winding reconfiguration may be achieved by controlling the switching sequences for the first inverter module 202 and the second inverter module 204. The configuration described can drive each winding independently from the others. Driving the phase windings includes flowing current through the phase windings or providing a voltage across the phase windings by operating the power switching devices of the inverter modules.

The controller 270 may be programmed to detect an open-circuit condition in the phase windings of the electric machine 214. For example, the controller 270 may monitor the currents flowing through the phase windings and the voltage across the phase windings. An open-circuit condition may be present when a phase winding is damaged and current cannot flow therethrough. An open-circuit condition may further include conditions in which wiring between the inverters and the phase windings becomes damaged or disconnected such that no current can flow to the phase winding. The controller 270 may monitor the voltage across and/or the current through each of the phase windings. If a predetermined voltage-current relationship is not satisfied, an open circuit condition may be detected. For example, when a voltage is applied across the phase winding and current remains zero, the controller 270 may indicate an open circuit condition. Open-circuit detection may be continuously performed or may be checked under predetermined conditions (e.g., ignition on). The controller 270 may check for an open-circuit condition for each of the phase windings and may identify which of the phase windings is open-circuited.

The first inverter module 202 may be operated to produce voltages at the associated connections to the phase windings. The voltage produced by the first inverter module 202 at the first phase winding 206 may be referenced as $V_{a1n1}$. The voltage produced by the first inverter module 202 at the second phase winding 208 may be referenced as $V_{b1n1}$. The voltage produced by the first inverter module 202 at the third phase winding 210 may be referenced as $V_{c1n1}$. The voltage produced by the first inverter module 202 at the fourth phase winding 212 may be referenced as $V_{d1n1}$. The voltage produced by the first inverter module 202 at the fifth phase winding 213 may be referenced as $V_{e1n1}$.

The second inverter module 204 may be operated to produce voltages at the associated connections of the phase windings. The voltage produced by the second inverter module 204 at the first phase winding 206 may be referenced as $V_{a2n2}$. The voltage produced by the second inverter module 204 at the second phase winding 208 may be referenced as $V_{b2n2}$. The voltage produced by the second inverter module 204 at the third phase winding 210 may be referenced as $V_{c2n2}$. The voltage produced by the second inverter module 204 at the fourth phase winding 212 may be referenced as $V_{d2n2}$. The voltage produced by the second inverter module 204 at the fifth phase winding 213 may be referenced as $V_{e2n2}$.

Operating the first inverter module 202 and the second inverter module 204 may result in a voltage across each phase winding. The voltage across each of the phase windings may be the difference between the voltage provided by the first inverter module 202 and the voltage provided by the second inverter module 204.

Under normal operating conditions without an open-circuited phase winding, the first inverter module 202 may drive the phase windings with a sinusoidal voltage waveform having an amplitude of $V_m$. The frequency of the sinusoidal voltage waveform may be dependent upon the speed rotation of a shaft of the electric machine 214. The controller 270 may receive a torque and/or speed request that is based on driver input (e.g., accelerator pedal). The controller 270 may determine the voltage control signals that create the desired amount of torque. For example, the controller 270 may adjust the voltage amplitude to achieve the desired torque level. Further, in the absence of any open-circuit windings, the controller 270 may operate the inverters to drive the windings of the electric machine 214 in a star configuration.

A star connection can be created by switching on all of the lower power switching devices of one of the inverter modules. The controller 270 may then operate the other inverter to supply the desired voltage waveform across the phase windings. For example, the star connection may be achieved by switching on all the lower power switching devices (e.g., 242, 246, 250, 252, 258) of the second inverter module 204. In this mode, the upper power switching devices (e.g., 240, 244, 248, 252, 256) of the second power inverter 204 may remain switched off. Switching on all the lower power switching devices of the second inverter module 204 connects one side of each phase winding to a common conductor. Further, the common conductor may be coupled to the DC bus return conductor 203. The first inverter module 202 may then be controlled to apply a voltage to each of the phase windings of the electric machine 214 by operating the associated upper and lower power switching devices.

In the presence of an open-circuit condition in one of the phase windings, current cannot flow through the open-circuited winding. However, the remaining four phase windings can handle current flow and are available for torque production. Assuming an open-circuit condition in the first phase winding 206, the voltage amplitude may be adjusted to produce the same amount of torque as during normal operating conditions. The example also assumes that all the lower switching devices of the second inverter module 204 are switched on to create a star connection. The voltages may be applied as follows:

$$V_{a1n1}=0 \quad (1)$$

$$V_{b1n1}=1.382\ V_m \cos(\theta-\pi/5) \quad (2)$$

$$V_{c1n1}=1.382\ V_m \cos(\theta-4\pi/5) \quad (3)$$

$$V_{d1n1}=-1.382\ V_m \cos(\theta-\pi/5) \quad (4)$$

$$V_{e1n1}=-1.382\ V_m \cos(\theta-4\pi/5) \quad (5)$$

$$V_{a2n2}=0 \quad (6)$$

$$V_{b2n2}=0 \quad (7)$$

$$V_{c2n2}=0 \quad (8)$$

$$V_{d2n2}=0 \quad (9)$$

$$V_{e2n2}=0 \quad (10)$$

The switching devices of the of first inverter module 202 may be operated to achieve the above voltage waveforms at each of the phase windings. θ represents the rotor position and may be derived from the rotor position measurement device 272. When operated as described, the electric machine 214 is configured in a star configuration. By operating the inverter modules in a different manner, a square configuration may be achieved.

Figure 3:
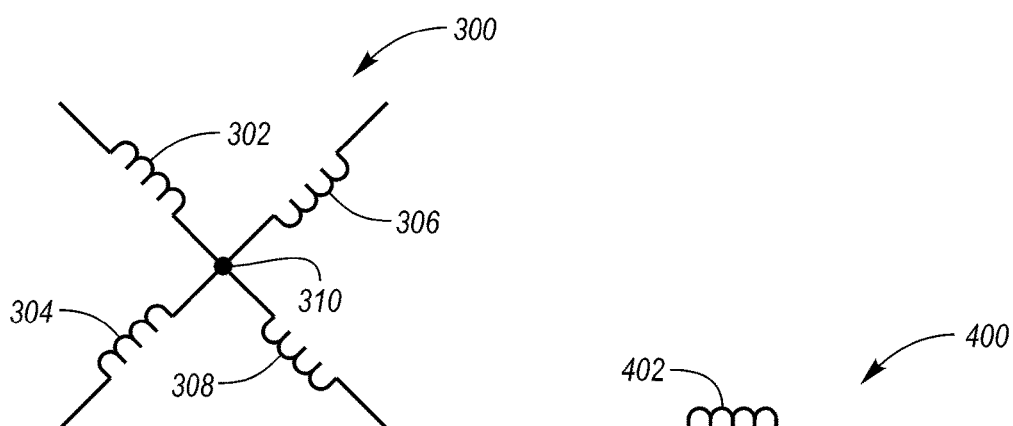
FIG. 3 depicts windings connected in a star configuration.
Figure 4:
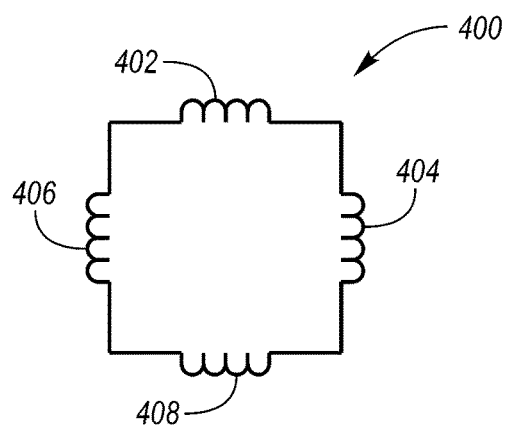
FIG. 4 depicts windings connected in a square configuration.

FIG. 3 depicts a first set 300 of four windings configured in a star configuration. For example, a first winding 302, a second winding 304, a third winding 306, and a fourth winding 308 may be coupled such that one side of each of the windings is connected to a common neutral point 310. FIG. 4 depicts a second set 400 of four windings configured in a square configuration. For example, a first winding 402 is coupled to a second winding 404 and a third winding 406. The second winding 404 and the third winding are also coupled to a fourth winding 408. In the square configuration, there is not common point to which all of the windings are connected. In the square configuration, each winding is effectively controlled as if each winding is connected to two other windings. In the square configuration, the windings may be connected in a loop such that each winding is electrically coupled to two other windings.

For example, to operate the windings in a square configuration, the voltages may be applied to the phase windings as follows:

$$V_{a1n1} = 0 \quad (11)$$

$$V_{b1n1} = -0.7266 V_m \cos(\theta + 3\pi/5) \quad (12)$$

$$V_{c1n1} = -0.7266 V_m \cos(\theta) \quad (13)$$

$$V_{d1n1} = -0.7266 V_m \cos(\theta) \quad (14)$$

$$V_{e1n1} = -0.7266 V_m \cos(\theta - 3\pi/5) \quad (15)$$

$$V_{a2n2} = 0 \quad (16)$$

$$V_{b2n2} = -0.7266 V_m \cos(\theta) \quad (17)$$

$$V_{c2n2} = -0.7266 V_m \cos(\theta - 3\pi/5) \quad (18)$$

$$V_{d2n2} = -0.7266 V_m \cos(\theta + 3\pi/5) \quad (19)$$

$$V_{e2n2} = -0.7266 V_m \cos(\theta) \quad (20)$$

In this example, the lower switching devices of the second inverter module 204 are not permanently switched on. The lower switching devices of the second inverter module 204 may be switching on and off according to control strategy for generating the desired voltage waveform. Applying the voltage waveforms described by equations 11-20, the electric machine 214 is operated as if it were connected in a square configuration. In the square configuration, the controller can operate the inverters to drive the windings that are not open-circuited by controlling a voltage output of each phase leg of the inverters such that voltages applied to the windings are the same as if the windings were physically connected in a loop in which each of the windings is electrically coupled to two other windings. Operating in the square configuration allows better utilization of the DC bus voltage and extends the speed region when compared with the star configuration. The benefits of operating the electric machine 214 in a square configuration are further detailed below. Note that voltage waveforms described may be the result of a control strategy that is configured to achieve a desired torque level. It may be expected that the voltage waveforms have the phase relationship as described by the equations, but the amplitude may vary based on the desired torque level.

The above examples assume that the voltage amplitude to achieve a desired torque value during normal operation is $V_m$. In the event of a single open-circuit winding, it is desirable to achieve the same desired torque value. In the star configuration with a single open-circuit winding, it is observed that the voltage amplitude must be increased (e.g., greater than $V_m$) to achieve the same desired torque value. For example, the voltage amplitude may be increased by a factor of 1.382. In the square configuration with a single open-circuit winding, it is observed that the voltage amplitude must be decreased (e.g., less than $V_m$) to achieve the same desired torque value. For example, the voltage amplitude may be decreased by a factor of 0.7266.

FIG. 5 depicts a first graph 500 of torque-speed curves in the various modes of operation. A first curve 502 depicts the normal operation of the electric machine. Normal operation may be when all phases are functioning without any open-circuit conditions. A second curve 504 depicts operation with one phase open-circuited and the windings driven in the star configuration. A third curve 506 depicts operation with one phase open-circuited and the windings driven in the square configuration. It may be recognized from the first graph 500 that the torque of the second curve 504 decreases below the maximum torque of the third curve 506 at a particular speed threshold 508. When the speed is above this speed threshold 508, the maximum torque of the third curve 506 exceeds the maximum torque of the second curve 504.

FIG. 6 depicts a second graph 600 of torque-speed curves. The first curve 502 representing normal operation is recreated on the second graph 600. A second curve 604 depicts the torque-speed operation obtained by switching between the star configuration and the square configuration in the presence of an open-circuited winding. The second curve 604 may be achieved by operation the electric machine 214 in a star configuration below the speed threshold 508. Above the speed threshold 508, the electric machine 214 may be operated in the square configuration. The resulting operation improves the torque-speed performance in both speed ranges. Operating in this manner results in the availability of additional torque above the speed threshold 508 when compared to the star configuration. The method of operation results in improved vehicle performance when an open-circuit condition is present in one of the windings.

During normal operation (e.g., without detection of any open-circuited phase windings), the controller 270 may operate the inverters to drive the windings in a star configuration as the default mode of operation. Operating the inverters to drive the windings in the star configuration may be achieved by causing the power switching devices of one of the inverters to couple the associated terminals of the phase windings to a common conductor. The controller may then control a torque output by causing a voltage output for each phase leg the inverter associated with an end of the windings opposite to that coupled to the common conductor. In the star configuration, an amplitude of the voltage output may be greater than a voltage amplitude applied in an absence of detecting the open circuit of the one of the windings. The controller may operate the inverters in the square configuration by controlling a voltage output of each phase leg of the inverters to cause a voltage pattern across the windings. In response to detecting an open circuit in one of the windings, the controller 270 may operate the inverters to drive the remaining windings in a square configuration. The transition to the square configuration may be further conditioned on a speed of the electric machine 214 exceeding a speed threshold. The controller may operate the inverters to drive the windings in the square configuration by operating the one or more inverters so that voltages applied to the windings are the same as if the windings were physically connected in a loop in which each of the windings is electrically coupled to two other windings. In the square configuration, an amplitude of the voltage output of each phase leg may be less than a voltage amplitude applied in an absence of detecting the open circuit of the one of the windings. The inverters may be operated to provide zero voltage to the open-circuited phase winding. While an open-circuit is detected, if the electric machine speed falls below the speed threshold, the controller may operate the inverters to drive the windings in the star configuration.

In the presence of the an open-circuit phase winding, the system may switch between driving windings in a star configuration and driving the windings in a square configuration based on the electric machine speed. At speeds below the speed threshold, it may be observed that the lower power switching devices of one of the inverters are all switched on. At speeds above the speed threshold, it may be observed that the lower power switching device are switched on and off to create a voltage output.

FIG. 7 depicts a possible flowchart 700 of a sequence of operations that may be implemented in the controller 270. The sequence of operations may be performed periodically. The sequence is entered at operation 702. At operation 704, a check is performed to determine if a winding is open circuited. For example, the controller may implement diagnostic algorithms to detect an open-circuited winding. If there is no open-circuited winding, then operation 712 is performed to exit the sequence. If an open-circuited winding is detected, operation 706 may be performed. At operation 706, the electric machine speed is compared to a speed threshold. If the speed is less than the speed threshold, operation 708 may be performed. The speed threshold may be a speed at which a maximum torque of the electric machine operated in the star configuration is equal to a maximum torque of the electric machine operated in the square configuration (e.g., FIG. 5, speed threshold 508). At operation 708, the inverters may be operated to drive the phase windings of the electric machine in a star configuration. If the speed is greater than or equal to the speed threshold, operation 710 may be performed. At operation 710, the inverters may be operated to drive the phase windings of the electric machine in a square configuration.

The system and method for operating the electric machine improves the system performance in a presence of an open-circuited winding. The system allows each winding to be independently controlled and enables operation of the electric machine in a star or square configuration. By changing the connection configuration, improve torque capability can be achieved in the presence of an open-circuit of one of the windings.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a pair of inverters, each having five phase legs electrically coupled at opposite ends of windings of a live-phase electric machine; and
a controller programmed to operate the inverters to drive the windings in a star configuration, and, responsive to detecting an open circuit in one of the windings and a speed of the electric machine exceeding a threshold, operate the inverters to drive the remaining windings in a square configuration.

2. The vehicle of claim 1 wherein the controller is further programmed to operate the inverters to drive the windings in the star configuration by causing switching devices in one of the inverters to connect associated ends of each of the windings to a common conductor.

3. The vehicle of claim 2 wherein the controller is further programmed to control a torque output of the electric machine by causing a voltage output for each phase leg of the one of the inverters associated with an end of the windings opposite to that coupled to the common conductor.

4. The vehicle of claim 3 wherein an amplitude of the voltage output is greater than a voltage amplitude applied in an absence of detecting the open circuit of the one of the windings.

5. The vehicle of claim 1 wherein the controller is further programmed to operate the inverters to drive the remaining windings in the square configuration by controlling a voltage output of each phase leg of the inverters such that voltages applied to the windings are the same as if the windings are physically connected in a loop in which each of the windings is electrically coupled to two other windings.

6. The vehicle of claim 5 wherein an amplitude of the voltage output of each phase leg is less than a voltage amplitude applied in an absence of detecting the open circuit of the one of the windings.

7. The vehicle of claim 1 wherein the controller is further programmed to operate the inverters to provide zero voltage to the one of the windings.

8. The vehicle of claim 1 wherein the threshold is a speed at which a maximum torque of the electric machine driven in the star configuration is equal to a maximum torque of the electric machine driven in the square configuration.

9. The vehicle of claim 1 wherein the controller is further programmed to, responsive to the speed of the electric machine falling below the threshold while detecting the open circuit of the one of the windings, operate the inverters to drive the remaining windings in the star configuration.

10. A method comprising:
operating one or more inverters to drive windings of a five-phase electric machine in a star configuration; and
responsive to detecting an open circuit in one of the windings and a speed of the electric machine exceeding a threshold, changing from operating the inverters to drive the windings in the star configuration to operating the inverters to drive the windings that are not open-circuited in a square configuration.

11. The method of claim 10 further comprising, responsive to the speed falling below the threshold while the one of the windings is open-circuited, changing from operating the inverters to drive the windings that are not open-circuited in the square configuration to operating the inverters to drive the windings that are not open-circuited in the star configuration.

12. The method of claim 10 wherein the threshold is a speed at which a maximum torque of the electric machine driven in the star configuration is equal to a maximum torque of the electric machine driven in the square configuration.

13. The method of claim 10 wherein operating the inverters to drive the windings in the star configuration includes operating one of the inverters to selectively couple each of the windings to a common neutral point.

14. The method of claim 10 wherein operating the inverters to drive the windings in the square configuration includes operating the one or more inverters so that voltages applied to the windings are the same as if the windings are physically connected in a loop in which each of the windings is electrically coupled to two other windings.

15. An electrified powertrain comprising:
an electric machine having five phase windings;
one or more inverters having phase legs electrically coupled to each end of the windings; and
a controller programmed to, responsive to detecting one of the windings being open circuited, change from operating the inverters to drive all of the windings in a star configuration to operating the inverters to drive the windings in a square configuration that excludes the one of the winding.

16. The electrified powertrain of claim 15 wherein the controller is further programmed to operate the inverters to drive the windings in the star configuration by causing switching devices in one of the inverters to connect au associated end of each of the windings to a common point.

17. The electrified powertrain of claim 16 wherein the controller is further programmed to control a torque output of the electric machine by causing a voltage output for each of the phase legs of the one or more inverters associated with an end of the windings that is not coupled to the common point.

18. The electrified powertrain of claim 15 wherein the controller is further programmed to operate the inverters in the square configuration by operating the one or more inverters such that voltages applied to the windings are the same as if the windings are physically connected in a loop in which each of the windings is electrically coupled to two other windings.

19. The electrified powertrain of claim 18 wherein an amplitude of a voltage output of each phase leg is less than a voltage amplitude when the one of the windings is not open circuited.

20. The electrified powertrain of claim 15 wherein the controller is further programmed to change from operating the inverters to drive the windings in the star configuration to operating the inverters to drive the windings in the square configuration responsive to a speed of the electric machine exceeding a threshold that is a predetermined speed at which a maximum torque of the electric machine driven in the star configuration is equal to a maximum torque of the electric machine driven in the square configuration.

\* \* \* \* \*